United States Patent [19]

Sham

[11] Patent Number: 5,771,781
[45] Date of Patent: Jun. 30, 1998

[54] ELECTRICAL DEEP-FRYER

[75] Inventor: John C. K. Sham, Hong Kong, Hong Kong

[73] Assignee: Pentalpha Enterprises Ltd., Aberdeen, Hong Kong

[21] Appl. No.: 901,526

[22] Filed: Jul. 28, 1997

[51] Int. Cl.[6] .................................................. A47J 37/12
[52] U.S. Cl. ............................... 99/336; 99/348; 99/407; 99/409; 99/410
[58] Field of Search ...................... 99/330–336, 403–407, 99/408–417, 348, 427; 210/167, DIG. 8; 126/391, 219

[56] References Cited

U.S. PATENT DOCUMENTS

| | | | |
|---|---|---|---|
| 4,852,471 | 8/1989 | Lansing | 99/336 X |
| 4,901,633 | 2/1990 | De Longhi | 99/409 |
| 5,027,697 | 7/1991 | De Longhi | 99/409 |

*Primary Examiner*—Timothy F. Simone
*Attorney, Agent, or Firm*—Salzman & Levy

[57] ABSTRACT

The present invention features an electrical, frying appliance that uniformly cooks food items placed within its frying basket. This frying appliance cyclically immerses and extracts the cooking basket into and out of a pan containing heated oil. In this fashion, the food in the basket is uniformly fried during the cooking cycle. The frying appliance contains a translationally moveable basket that operates by a parallel linkage driven by a gear train and worm drive mechanism. The translational movement of the basket allows the food in it to lie flat as it is immersed in the oil. The frying basket remains substantially horizontal during its movement between its immersed and non-immersed positions. In this fashion, the food items are prevented from shifting around in the frying basket. This allows the food to fry evenly within the basket and, when cycled, to be drained of oil periodically. The gear train and worm drive mechanisms that move the basket are both powered by a motor that is offset from the oil pan housing, allowing for a cooler, operational motor temperature. The motor is less subject to heated oil vapors and oil leakage that are usually associated with motors located at the bottom of an oil pan housing. The gear train and worm drive mechanisms are also offset from the oil pan, and are protected from heated oil vapors by the outside wall of the oil pan housing.

24 Claims, 6 Drawing Sheets

ELECTRICAL DEEP-FRYER

FIELD OF THE INVENTION

The present invention pertains to electrical cooking appliances and, more particularly, to an electrical deep-fryer that provides both automatic, cyclic immersion and extraction of the frying basket and its contents into and out of heated oil.

BACKGROUND OF THE INVENTION

Automatic, oil-frying machines are popular home appliances today. However, these oil fryers have been known to cook their baskets' contents unevenly. Additionally, many fried items retain too much oil and, when removed from the fryer, remain greasy and generally unwholesome.

The present invention reflects the discovery that foods that are periodically immersed and removed from a fryer during the cooking cycle become more evenly cooked, and tend to retain less oil after the cooking cycle is terminated.

A particular type of frying apparatus provides a tilting, rotating basket in order to periodically convey food items through heated oil. Such a machine is illustrated in U.S. Pat. Nos. 4,901,633 and 5,027,697, which were both issued to DE LONGHI on Feb. 20, 1990 and Jul. 2, 1991, respectively, both of which were entitled "Rotating Oblique Basket Frier for Cyclic Immersion Cooking". The aforementioned apparatus cyclically moves the food in the basket in and out of the heated oil, as the basket is caused to rotate in a tilted position.

Several problems are associated with the designated basket fryer. In the first place, the rotative drive motor is disposed below the heated oil pan, in close proximity to the heated oil. The motor must be carefully sealed so as to prevent oil leakage into the motor housing. Since it is so close to the oil, the motor must be designed to run hot. It must also be sufficiently insulated in order to prevent overheating of its parts. In addition to the basket fryer's operational problems, the food cooking is often uneven, despite the rotation of the basket into and out of the heated oil. Items such as puff balls, fritters and other, generally round items may tend to roll back into the oil, as the tilted basket is rotated. In addition, some items are retained longer within the oil because of their size and/or shape, thus causing an unevenness in the entire, cooked contents of the rotating basket.

The present inventor has determined that, in order to provide uniform frying of items in an electrical deep-fryer, it is necessary to cyclically immerse the basket into the heated oil in a uniform, translational manner. Using translational motion ensures that all of the food items in the basket meet and leave the heated oil at approximately the same time. The translational motion also ensures that none of the items in the basket will shift during the cooking cycle.

The current invention encompasses the development of a translationally movable basket for a deep-frying appliance. This translationally movable basket has a motor that is displaced to the side of the oil pan housing. As such, the motor is not disposed in proximity to the heated oil; hence, it can operate at lower temperatures.

It is an object of the present invention to provide an improved, electrical, frying appliance.

It is another object of this invention to provide an electrical, deep-frying appliance that cyclically immerses and extracts food items from heated oil during a cooking cycle.

It is still another object of the present invention to provide an electrical fryer that is less subject to fouling than are conventional appliances.

It is a further object of this invention to provide an electrical frying appliance that uniformly cooks foods.

SUMMARY OF THE INVENTION

In accordance with the present invention, there is provided an electrical frying appliance that uniformly cooks food items disposed within its frying basket. The frying appliance cyclically immerses and extracts the cooking basket into and out of a pan containing heated oil. Thus, the food in the inventive basket is more uniformly fried during the cooking cycle than is food in conventional appliances. The inventive frying appliance comprises a translationally moveable basket that operates by a parallel linkage driven by a gear train and worm drive mechanism. The translational movement of the basket allows the food disposed therein to lie flat as it is immersed in the oil. That is, the frying basket remains substantially horizontal during its movement between its immersed and non-immersed positions. In this fashion, the food items are prevented from shifting around in the frying basket. This allows the food to fry evenly therewithin and, when cycled, to be periodically drained of oil.

The gear train and worm drive mechanisms that move the basket are both powered by a motor that is offset from the oil pan housing, allowing for a cooler, operational motor temperature. The motor is thus less subject to heated oil vapors and oil leakage that are usually associated with motors disposed at the bottom of the oil pan housing. The gear train and worm drive mechanisms are also offset from the oil pan, and are protected from heated oil vapors by the outside wall thereof. Accordingly, the gear train and worm drives also experience less fouling by grease and oil than do those in a conventional appliance during the lifetime of the frying appliance.

BRIEF DESCRIPTION OF THE DRAWINGS

A complete understanding of the present invention may be obtained by reference to the accompanying drawings when considered in conjunction with the subsequent, detailed description, in which.

For the purposes of clarity and brevity, like elements and components will bear the same designations and numbers throughout the above figures.

DESCRIPTION OF THE PREFERRED EMBODIMENT

Generally speaking, the invention features an electrical, deep-frying appliance that cooks food uniformly. The frying appliance features a translationally movable frying basket, which allows for the cyclical immersion and extraction thereof, along with its food contents, into and out of heated oil. The translational movement of the basket ensures that food disposed therewithin does not shift during the immersion and extraction cycles.

Figure 1:
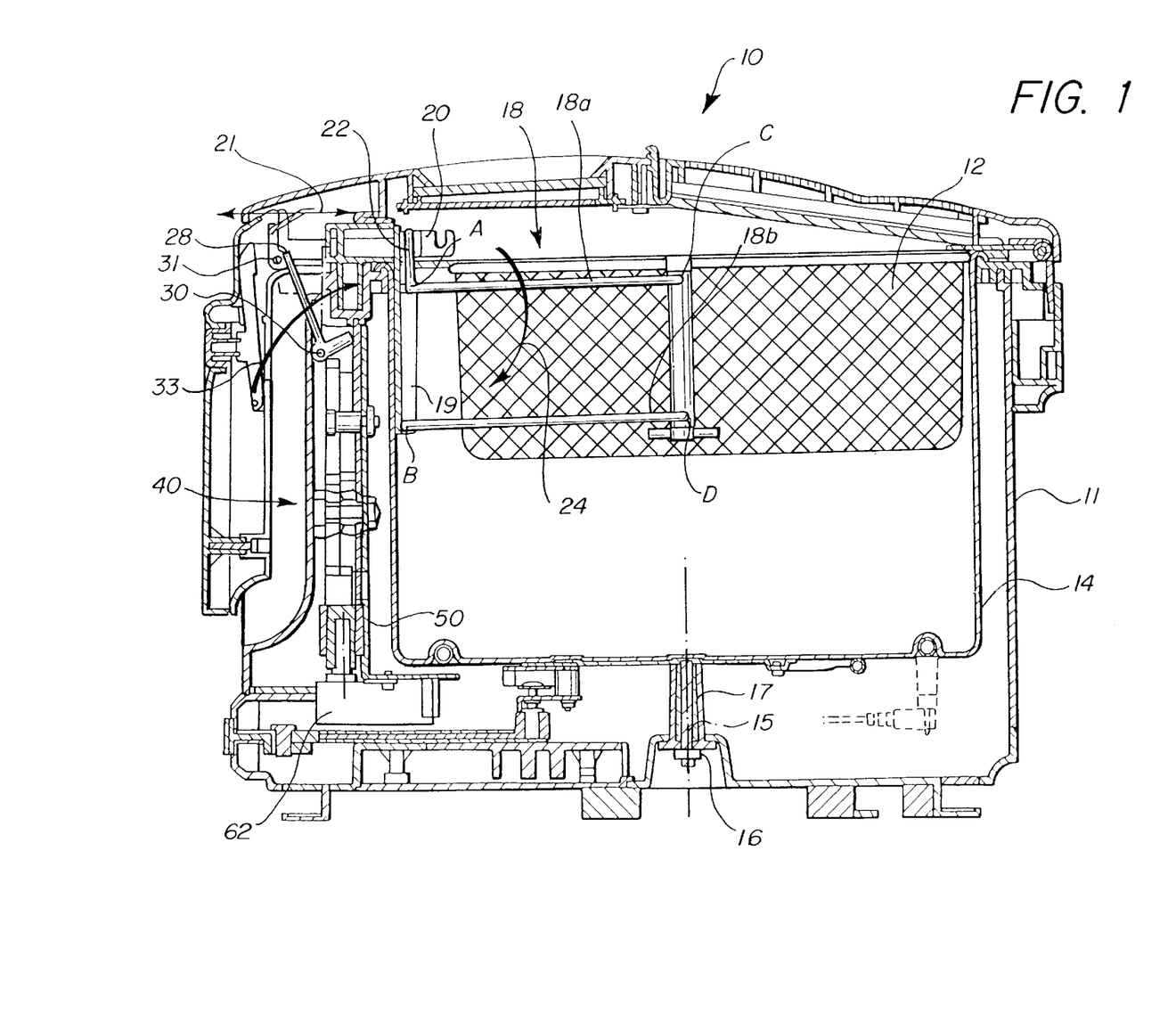
FIG. 1 illustrates a front, sectional view of the electrical, deep-frying appliance of this invention, with its frying basket disposed in its "up", or extracted, position.

Now referring to FIG. 1, an electrical, deep-frying appliance 10 is illustrated. The appliance 10 comprises a fryer housing 11, which contains a frying basket 12. The frying basket 12 is disposed within an oil pan housing 14. The oil pan housing 14 is mounted for rotation upon a spindle 15 that is rotationally anchored to the bottom of the fryer housing 11 by nut 16, through hollow bore 17.

The frying basket 12 is shown in an upper, extracted position with respect to the oil pan 14. The basket 12 is movably supported by a parallel linkage 18, comprising links 18a and 18b that are rotationally anchored to a fixed flange 19 about pivot points A and B, respectively, and rotationally fixed to basket 12 at points C and D, respectively. The upper link 18a of the translational linkage 18 comprises an extension arm 22 anchored to a horizontally moveable rod 20. Rod 20 is horizontally slidable in a reciprocal fashion, as shown by arrows 21. The rod 20 is spring-biased (not shown) to the left. The horizontal, reciprocal movement of rod 20 to the right, against its spring biasing, forces the extension arm 22 to pivot about pivot point A, thereby forcing the link 18a to pivot downwardly about pivot point A also, as shown by arrow 24. Link 18b follows the motion of its companion link 18a; it also pivots in direction 24, since the parallel, translational links 18a and 18b of linkage 18 are movably tied together, and act in the well-known sense attributable to this type of linkage.

Figure 3:
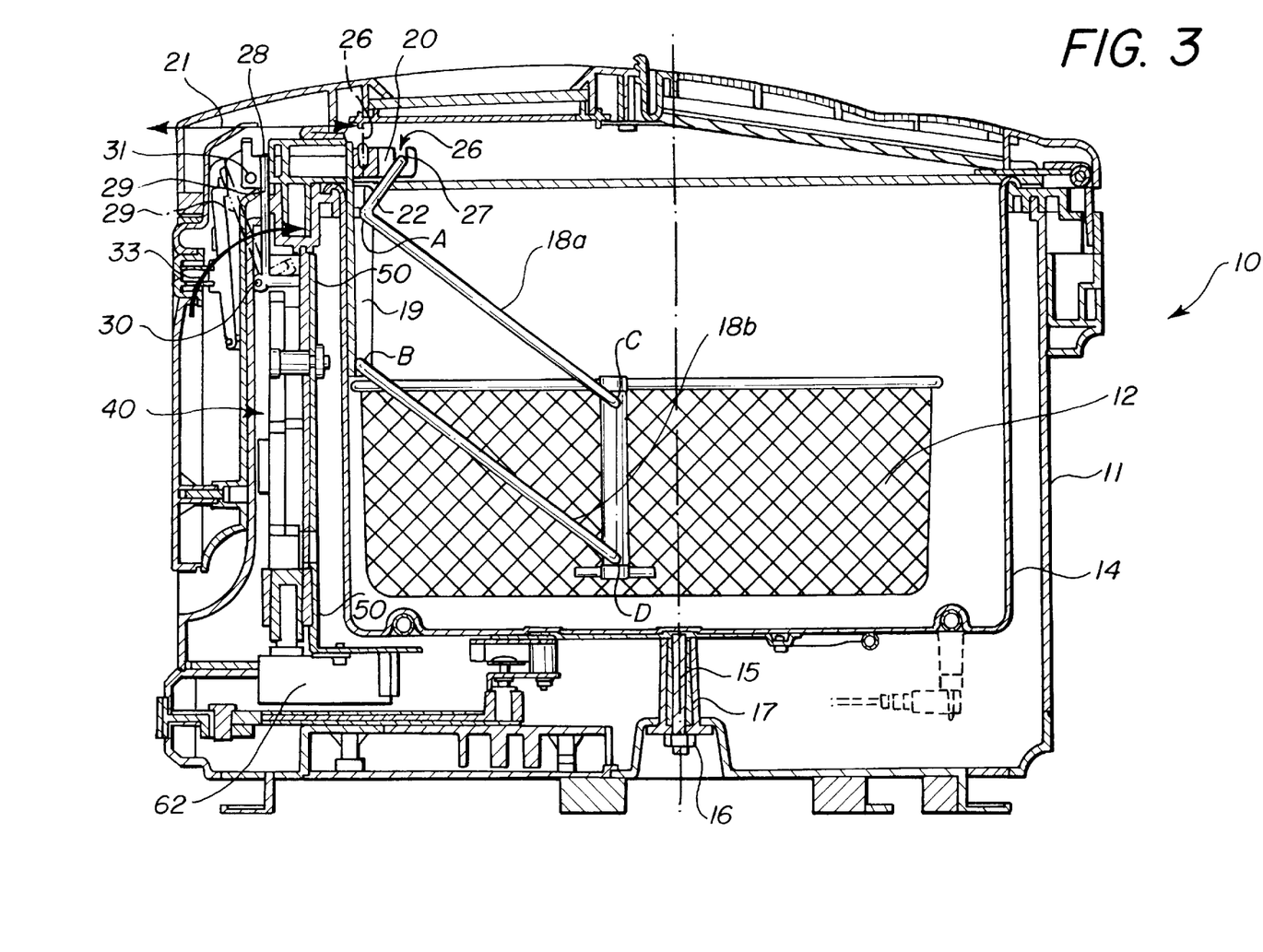
FIG. 3 shows the electrical, deep-frying appliance illustrated in FIG. 1, with its frying basket disposed in its lower position, immersed in oil.

The frying basket 12 is caused to translationally move downwardly within the oil pan housing 14, as linkage 18 pivots about pivot points A and B, in direction 24. Thus, the frying basket 12 is caused to descend into the bottom of the oil pan housing 14 and immerse the food contained within the basket into the heated oil that is disposed in the bottom of the oil pan housing 14, as shown in FIG. 3. During movement between its upper, retracted position (FIG. 1) and its immersed position (FIG. 3), the frying basket 12 remains substantially horizontal, so that food disposed within the basket does not shift.

Referring to FIG. 3, the electrical, deep-frying appliance 10 is shown in enlarged detail. Extension arm 22 of link 18a is moveably anchored in slot 26 of the slidable rod 20. The end 27 of the extension arm 22 comprises a round pin (not shown) that rides within slot 26 and follows the horizontal motion (arrows 21) of the slidable rod 20. The movement (arrow 21) of the slidably reciprocal rod 20 is imparted to the rod by a pivot link 29 that pivots about pivot point 30. The pivot link is shown in this view in both solid and phantom views. The solid view is its position in FIG. 3; the phantom view represents its position in FIG. 1. An upper portion 28 of the pivot link 29 rests against a fixed pin 31 that is anchored to the rod 20. The pivot link 29 moves from the angled position (FIG. 1) to the nearly vertical position (FIG. 3), as shown by arrow 33. The pivotable movement of pivot link 29 in a clockwise direction (arrow 33) causes the rod 20 to move to the right under its spring biasing, and causes the basket 12 to descend into the oil pan housing 14.

Figure 2:
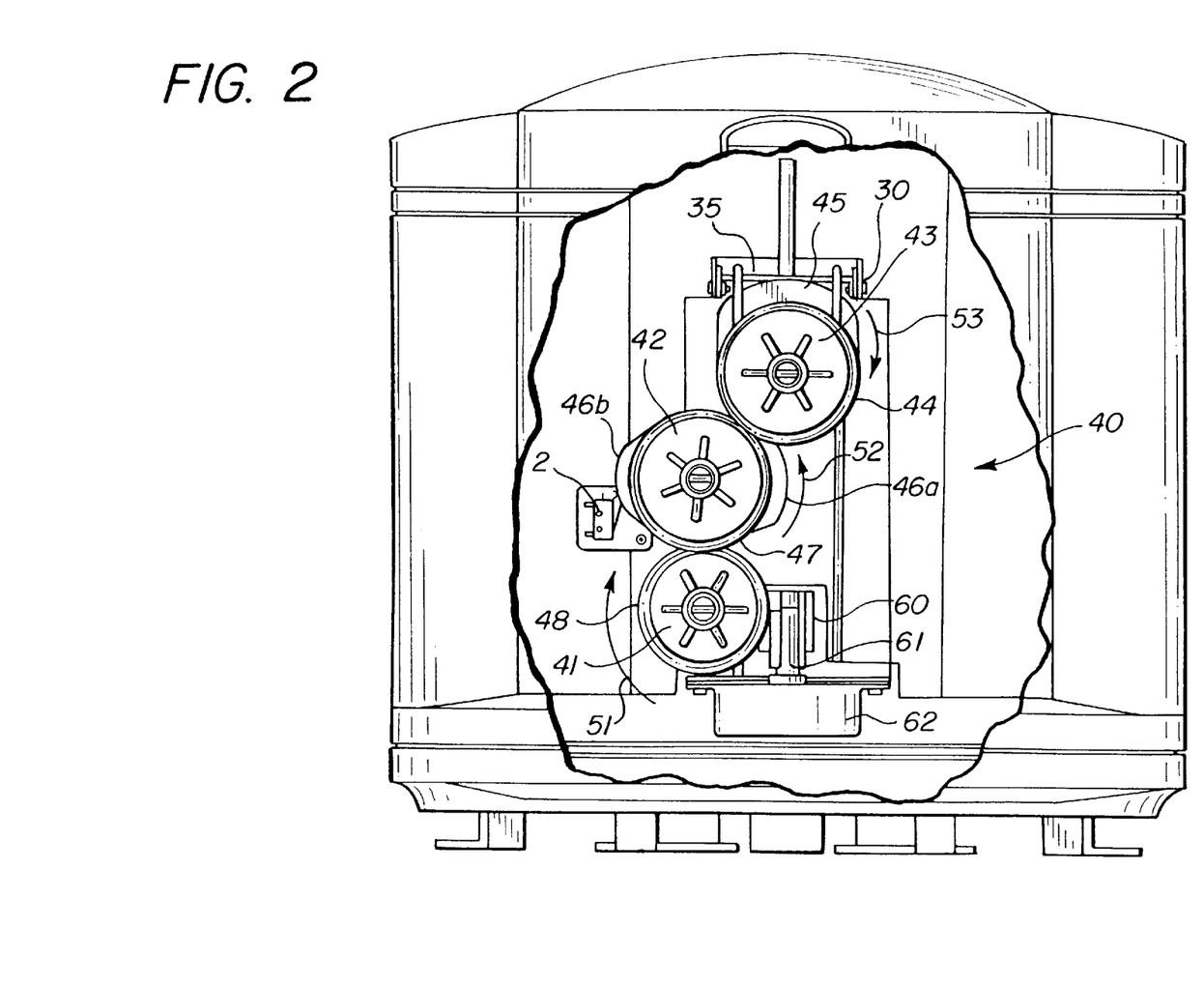
FIG. 2 depicts a side, internal view of the drive mechanism of the electrical, deep-frying appliance shown in FIG. 1, with the drive mechanism positioned for the frying basket in its "up", or extracted, position.
Figure 4:
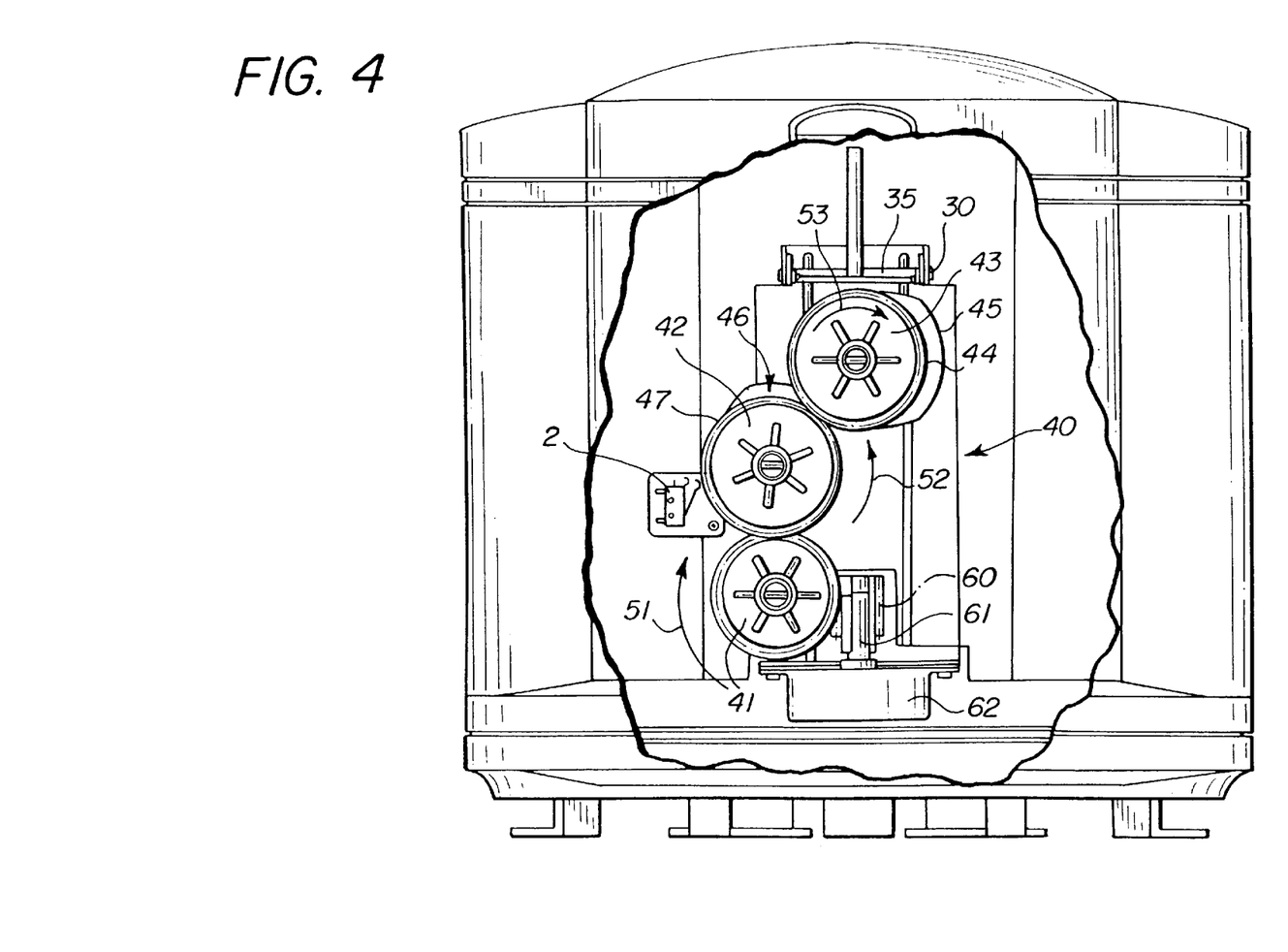
FIG. 4 illustrates the drive mechanism shown in FIG. 2 in a position corresponding to the immersion position of the frying basket shown in FIG. 3.

The pivot 30 about which pivot link 29 is caused to rotatively pivot comprises a worm 35, to which the pivot link 29 is fixedly attached, as better observed with reference to FIGS. 2 and 4.

Referring to FIGS. 2 and 4, a gear train 40 is depicted that comprises three engaged gears 41, 42 and 43. FIG. 2 represents the positions of these gears with respect to the upper basket position, as shown in FIG. 1. FIG. 4 depicts the gear positions with respect to the lower basket position, as illustrated in FIG. 3. As aforementioned, the pivot link 29 that is fixedly attached to worm 35 at pivot point 30 is caused to pivot as the worm 35 is caused to rotate. The worm 35 is rotatively driven by the gear train 40. The worm 35 is in direct, operative contact with the upper gear 43 of the gear train 40. The upper gear 43 is a complex gear having two separate gear surfaces 44 and 45. The surface 45 has teeth which contact the worm 35, rotatively driving it. The worm 35, in turn, rotatively drives the link 29 into the moving rod 20. The surface 44 of gear 43 contains gear teeth that are in meshing engagement with the teeth on the surface 47 of gear 42. Gear 41 has teeth on its meshing surface 48. The teeth of gear 41 mesh with and drive the teeth of gear 42, which, in turn, drives gear 43. The rotative drive direction of each gear is illustrated by arrows 51, 52 and 53, respectively. The lead drive gear 41 of the drive train 40 is driven by a worm 60 that is fixedly attached to the rotative shaft 61 of the drive motor 62.

The middle gear 42 of the gear drive train 40 is attached to a cam 46 that periodically comes into contact with switch 2, as gear 42 is caused to turn. Switch 2 is normally open; it is closed by the contact with the rotating cam 46. Switch 2 controls the movement of the basket from the upper, retracted position to its lower, immersed position within the oil pan housing 14. The description of the electrical controls, of which switch 2 is an integral part, is explained further hereinafter with respect to FIG. 5.

Referring again to FIGS. 1 and 3, motor 62 is considerably offset to the left of the oil pan housing 14. The gear train 40 is insulated from the oil pan housing 14 by an insulative wall 50. These two features of the design allow the drive mechanism to run freely, prevent fouling by heated oil vapors, and keep the drive mechanism operatively cool.

Figure 5:
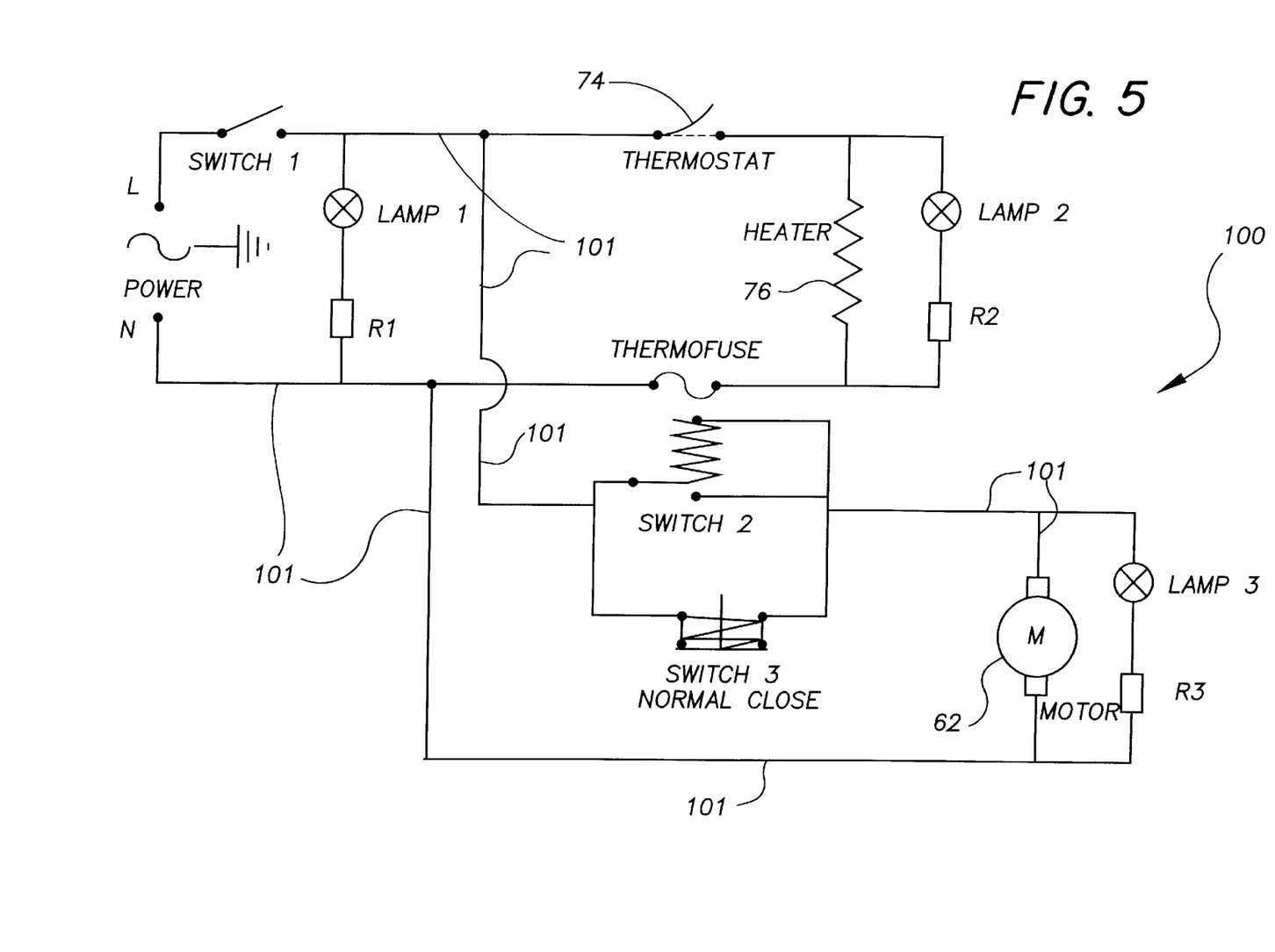
FIG. 5 depicts the electrical circuit for electrically actuating and operating the deep-frying appliance shown in FIGS. 1 through 4.

Referring to FIG. 5, the electrical circuit 100 of the deep-frying appliance 10 of this invention is shown. The circuit 100 allows the frying appliance 10 to operate in several different modes. The fryer appliance 10 can operate in an automatic, cyclic mode, wherein the basket 12 can automatically descend into and rise from the oil pan housing 14. When switch 2 is pushed downwardly, away from its spring biasing, a normally closed switch 3 is bypassed, which causes a short circuit of the sub-circuit 101 of the switch 3 motor control. This causes motor 62 to energize; it begins to operate continuously, thus causing the basket to cycle between its upper and lower positions.

At the beginning of the operative, cooking cycle, the basket may be caused to descend into the oil pan housing 14 by pushing the switch 2 once, upwardly, towards its spring. This single contact energizes the motor 62. The basket is caused to descend. As the gear train 40 continues to rotate, the cam 46 comes into contact with switch 2, thus cutting off the motor actuation and leaving the basket in its lower, immersed position. The second half of cam 46a pushes normally-closed switch 3 to the open position, cutting off the power to motor 62. Lamp 3 lights, showing that the appliance 10 is in a cooking cycle. At the end of the cooking cycle, switch 2 is pushed one more time in the spring direction to actuate the motor 62, thus causing the basket 12 to rise to its non-immersed, upper position. The first half of the cam 46b pushes the normally-closed switch 3 to its open position, thus cutting off power to motor 62.

Switch 1 is pushed to start the cooking cycle and to furnish power to the sub-circuit 101. Lamp 1 lights, indicating that the cooking cycle is active.

Lamp 2 lights when power is furnished to the heater 76, which is used to heat the oil in the oil pan housing 14. The thermostat 74 automatically interrupts the power supplied to the heater 76 when the oil's cooking temperature is reached. When the temperature of the oil falls below cooking temperature, the thermostat re-closes the circuit to the heater 76.

Figure 6:
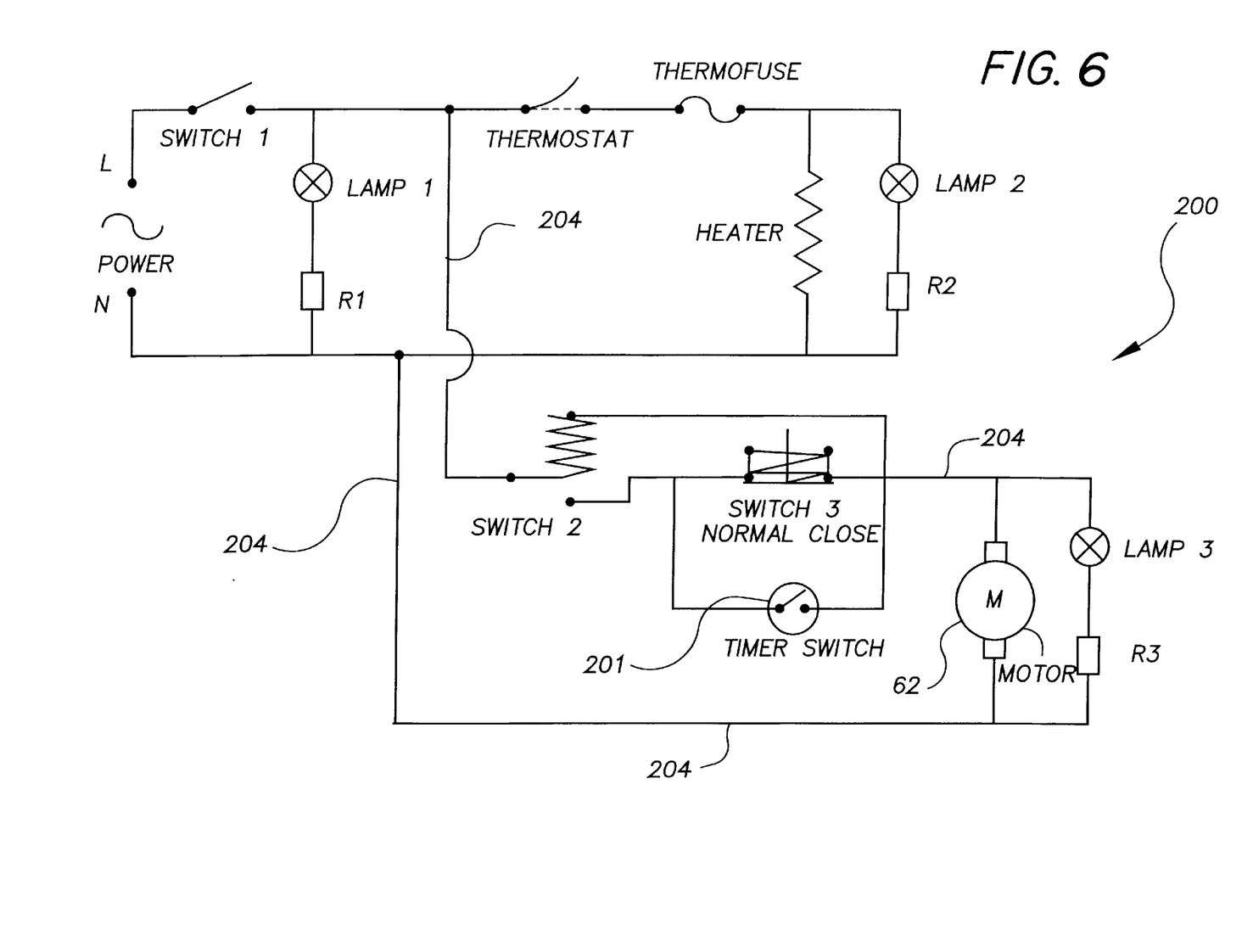
FIG. 6 shows an alternate embodiment for the electrical circuit illustrated in FIG. 5.

Referring to FIG. 6, an alternate embodiment is shown for the circuit 100 illustrated in FIG. 5. The alternate circuit 200 allows the deep-fryer basket 12 to cycle between the upper and lower positions continuously. This is accomplished by means of timer switch 201. The user sets the timer switch 201 for a given frying time and then actuates switch 2 to close the circuit 204 feeding power to motor 62. The motor 62 now begins to rotate, causing the basket 12 to rise and fall continuously until the time set for the timer switch 201 runs out. At this point in time, the basket 12 continues to move, because motor 62 continues to receive power through the circuit 204, via the closed path provided by switch 3. However, when the basket 12 reaches the highest position, switch 3 opens circuit 204, and basket movement ceases at the high position. This allows the user to easily remove the food from the basket 12.

As aforementioned, the movement of the basket 12 is indicated by lamp 3. The constant cycling of the basket 12 causes food to fry intermittently during the timed cycle.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A frying appliance that comprises a frying basket that is moveable between an upper, non-immersed, oil pan position and a lower, immersed, oil pan position, said frying appliance comprising:
   a housing supporting a moveable frying basket and a stationary oil pan disposed adjacent said frying basket, said oil pan having means for receiving and heating oil for frying food disposed in said frying basket;
   a translational mechanism connected to said frying basket for moving said frying basket between an upper, non-immersed, oil pan position to a lower, immersed, oil pan position, wherein said foods disposed in said frying basket are cooked in heated oil disposed in said oil pan, said translational mechanism allowing said frying basket to remain substantially horizontal during said movement between its upper and lower positions; and
   drive means operatively connected to said translational mechanism for driving said translational mechanism between said upper, non-immersed, oil pan position to said lower, immersed, oil pan position.

2. The frying appliance in accordance with claim 1, wherein said translational mechanism comprises two substantially parallel links pivotally connected to said frying basket and pivotally disposed with respect to said housing.

3. The frying appliance in accordance with claim 2, wherein said drive means comprises a gear train and worm mechanism for causing said two, substantially parallel links to pivot with respect to said housing, causing said basket to move relative thereto.

4. The frying appliance in accordance with claim 3, wherein said drive means further comprises a drive motor operatively connected to said gear train for rotatively driving said gear train.

5. The frying appliance in accordance with claim 4, wherein said drive means further comprises a switch, a rotative cam that is rotatable with said gear train, and an electrical circuit for powering said drive motor, said cam actuating said switch to control said electrical circuit in order to feed power to said drive motor.

6. The frying appliance in accordance with claim 4, wherein said drive means is disposed in an offset position with respect to said oil pan.

7. The frying appliance in accordance with claim 4, wherein said drive means is insulatively separated from said oil pan.

8. The frying appliance in accordance with claim 5, wherein said electrical circuit further comprises a timer switch that feeds power to said drive means continuously, whereby said frying basket cycles in and out of said oil pan continuously for a set time.

9. A frying appliance that comprises a frying basket that is moveable between an upper, non-immersed, oil pan position and a lower, immersed, oil pan position, said frying appliance comprising:
   a moveable frying basket for receiving items to be fried;
   a stationary oil pan disposed adjacent said frying basket, said oil pan having means for receiving and heating oil for frying said items disposed in said frying basket;
   a translational mechanism connected to said frying basket for moving said frying basket between an upper, non-immersed, oil pan position to a lower, immersed, oil pan position, wherein said items disposed in said frying basket are cooked in heated oil disposed in said oil pan, said translational mechanism allowing said frying basket to remain substantially horizontal during said movement between its upper and lower positions; and
   drive means operatively connected to said translational mechanism for driving said translational mechanism between said upper, non-immersed, oil pan position to said lower, immersed, oil pan position.

10. The frying appliance in accordance with claim 9, further comprising a frame for supporting said oil pan, and wherein said translational mechanism comprises two substantially parallel links pivotally connected to said frying basket and pivotally anchored to said frame.

11. The frying appliance in accordance with claim 10, wherein said drive means comprises a gear train and worm mechanism for causing said two, substantially parallel links to pivot with respect to said housing, causing said basket to move relative thereto.

12. The frying appliance in accordance with claim 11, wherein said drive means further comprises a drive motor operatively connected to said gear train for rotatively driving said gear train.

13. The frying appliance in accordance with claim 12, wherein said drive means further comprises a switch, a rotative cam that is rotatable with said gear train, and an electrical circuit for powering said drive motor, said cam actuating said switch to control said electrical circuit in order to feed power to said drive motor.

14. The frying appliance in accordance with claim 12, wherein said drive means is disposed in an offset position with respect to said oil pan.

15. The frying appliance in accordance with claim 12, wherein said drive means is insulatively separated from said oil pan.

16. The frying appliance in accordance with claim 13, wherein said electrical circuit further comprises a timer switch that continuously feeds power to said drive means, whereby said frying basket cycles in and out of said oil pan continuously for a set time.

17. A frying appliance that comprises a frying basket that is moveable between an upper, non-immersed, oil pan position to a lower, immersed, oil pan position, said frying appliance comprising:

a moveable frying basket for receiving items to be fried;

a stationary oil pan disposed adjacent said frying basket, said oil pan having means for receiving and heating oil for frying said items disposed in said frying basket;

a translational mechanism connected to said frying basket, said translational mechanism comprising a substantially parallel linkage for moving said frying basket between an upper, non-immersed, oil pan position to a lower, immersed, oil pan position, wherein said items disposed in said frying basket are cooked in heated oil disposed in said oil pan, said translational mechanism allowing said frying basket to remain substantially horizontal during said movement between its upper and lower positions; and drive means operatively connected to said translational mechanism for driving said translational mechanism between said upper, non-immersed, oil pan position to said lower, immersed, oil pan position.

18. The frying appliance in accordance with claim 17, further comprising a frame for supporting said oil pan and said translational mechanism, said parallel linkage being pivotally connected to said frying basket and pivotally anchored to said frame.

19. The frying appliance in accordance with claim 18, wherein said drive means comprises a gear train and worm mechanism for causing said parallel linkage to pivot with respect to said housing, causing said basket to move relative thereto.

20. The frying appliance in accordance with claim 18, wherein said drive means further comprises a drive motor operatively connected to said gear train for rotatively driving said gear train.

21. The frying appliance in accordance with claim 20, wherein said drive means further comprises a switch, a rotative cam that is rotatable with said gear train, and an electrical circuit for powering said drive motor, said cam actuating said switch to control said electrical circuit in order to feed power to said drive motor.

22. The frying appliance in accordance with claim 20, wherein said drive motor is disposed in an offset position with respect to said oil pan.

23. The frying appliance in accordance with claim 20, wherein said drive motor is insulatively separated from said oil pan.

24. The frying appliance in accordance with claim 21, wherein said electrical circuit further comprises a timer switch that feeds power to said drive means continuously, whereby said frying basket cycles in and out of said oil pan continuously for a set time.

\* \* \* \* \*